United States Patent
Deshmukh et al.

(10) Patent No.: US 12,153,531 B2
(45) Date of Patent: Nov. 26, 2024

(54) MULTIPLE-CORE MEMORY CONTROLLER

(71) Applicant: QUALCOMM Incorporated, San Diego, CA (US)

(72) Inventors: Pankaj Deshmukh, San Diego, CA (US); Shyamkumar Thoziyoor, San Diego, CA (US); Vishakh Balakuntalam Visweswara, Vancouver (CA); Jungwon Suh, San Diego, CA (US); Subbarao Palacharla, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 18/059,937

(22) Filed: Nov. 29, 2022

(65) Prior Publication Data

US 2024/0176751 A1     May 30, 2024

(51) Int. Cl.
    *G06F 13/16*     (2006.01)
(52) U.S. Cl.
    CPC ...... *G06F 13/1689* (2013.01); *G06F 13/1642* (2013.01); *G06F 13/1673* (2013.01)
(58) Field of Classification Search
    None
    See application file for complete search history.

(56) References Cited

U.S. PATENT DOCUMENTS

| | | | | |
|---|---|---|---|---|
| 9,281,037 | B2* | 3/2016 | Smith | G06F 3/0604 |
| 9,733,855 | B1* | 8/2017 | Ong | G06F 1/12 |
| 9,805,775 | B1* | 10/2017 | Ong | G06F 13/1689 |
| 10,437,480 | B2* | 10/2019 | Luan | G06F 3/0683 |
| 10,642,538 | B1* | 5/2020 | MacLaren | G06F 30/3308 |
| 11,126,379 | B2* | 9/2021 | Kim | G06F 3/0679 |
| 11,556,164 | B2* | 1/2023 | Ware | G06F 13/1689 |
| 11,837,322 | B2* | 12/2023 | Nin | G11C 7/1096 |
| 2012/0072677 | A1* | 3/2012 | Biswas | G06F 13/18 |
| | | | | 711/149 |
| 2023/0013181 | A1* | 1/2023 | Bains | G11C 5/04 |

OTHER PUBLICATIONS

International Search Report and Written Opinion—PCT/US2023/076589—ISA/EPO—Jan. 18, 2024 (2206950WO).

* cited by examiner

*Primary Examiner* — Elias Mamo
(74) *Attorney, Agent, or Firm* — NORTON ROSE FULBRIGHT US LLP/Qualcomm

(57) ABSTRACT

This disclosure provides systems, methods, and devices for memory systems that support operating a least portions of a memory core at a frequency lower than a memory clock to reduce power consumption and cost. In a first aspect, a memory controller includes a first core for scheduling a first memory operation for a first portion of a clock cycle of the memory clock and includes a second core for scheduling a second memory operation for a second portion of the clock cycle of the memory clock. Other aspects and features are also claimed and described.

25 Claims, 9 Drawing Sheets

MULTIPLE-CORE MEMORY CONTROLLER

TECHNICAL FIELD

Aspects of the present disclosure relate generally to computer information systems, and more particularly, to memory systems for storing data. Some features may enable and provide improved memory capabilities for interfacing a host device to memory.

INTRODUCTION

A computing device (e.g., a laptop, a mobile phone, etc.) may include one or several processors to perform various computing functions, such as telephony, wireless data access, and camera/video function, etc. A memory is an important component of the computing device. The processors may be coupled to the memory to perform the aforementioned computing functions. For example, the processors may fetch instructions from the memory to perform the computing function and/or to store within the memory temporary data for processing these computing functions, etc.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

An apparatus in accordance with at least one embodiment includes a memory controller configured to communicate with from a host device to a memory. The memory includes a memory array configured to store data. The memory is configured to provide the data stored in the memory array to the host in performing computing functions at the request of the memory controller. The memory controller may include multiple cores configured to schedule memory operations for the memory. In some aspects, the memory controller may interface with the memory at a first speed (e.g., the memory clock frequency). The cores of the memory controller may operate at a second speed (e.g., the memory controller clock frequency) that is lower than the memory speed (e.g., the memory clock frequency). A bandwidth, or speed of transferring data to and/or from the memory, is proportional to the memory clock. Configurations for a memory controller according to aspects described herein provide for operating multiple cores at a slower speed than the memory with little or no reduction in utilization of the bandwidth available from the memory based on the memory clock. An apparatus in accordance with at least one embodiment includes a host device with a memory controller configured according to aspects described herein with multiple cores to communicate with a memory.

In one aspect of the disclosure, a method for scheduling memory operations based on memory requests received from components of a host device includes scheduling, by a first core of the plurality of cores of a memory controller, a first memory operation for a first portion of a clock cycle of the memory clock; scheduling, by a different second core of the plurality of cores of the memory controller, a second memory operation for a second portion of the clock cycle of the memory clock; and transmitting, by a memory physical (PHY) interface of the memory controller during the clock cycle of the memory clock, first signals corresponding to the first memory operation and second signals corresponding to the second memory operation.

In an additional aspect of the disclosure, an apparatus includes at least one processor and a memory coupled to the at least one processor. The at least one processor is configured to perform operations including scheduling, by a first core of the plurality of cores of a memory controller, a first memory operation for a first portion of a clock cycle of the memory clock; scheduling, by a different second core of the plurality of cores of the memory controller, a second memory operation for a second portion of the clock cycle of the memory clock; and transmitting, by a memory physical (PHY) interface of the memory controller during the clock cycle of the memory clock, first signals corresponding to the first memory operation and second signals corresponding to the second memory operation. The processor may be a processor, controller, or other logic circuitry in a host. The processor may alternatively be a controller embedded in a memory device.

In an additional aspect of the disclosure, an apparatus includes means for scheduling, by a first core of the plurality of cores of a memory controller, a first memory operation for a first portion of a clock cycle of the memory clock; means for scheduling, by a different second core of the plurality of cores of the memory controller, a second memory operation for a second portion of the clock cycle of the memory clock; and means for transmitting, by a memory physical (PHY) interface of the memory controller during the clock cycle of the memory clock, first signals corresponding to the first memory operation and second signals corresponding to the second memory operation.

In a further aspect of the disclosure, an apparatus may include a memory controller operating based on a first clock at a memory controller clock frequency, wherein the memory controller is comprised of a memory physical (PHY) interface operated based on a memory clock at a memory clock frequency and of a plurality of cores, each of the plurality of cores operated at the memory controller clock frequency which is less than the memory clock frequency, coupled to a memory through a channel by the memory physical (PHY) interface, configured to access data stored in the memory through the channel and the memory physical (PHY) interface, and configured to perform operations including scheduling, by a first core of the plurality of cores of a memory controller, a first memory operation for a first portion of a clock cycle of the memory clock; scheduling, by a different second core of the plurality of cores of the memory controller, a second memory operation for a second portion of the clock cycle of the memory clock; and transmitting, by a memory physical (PHY) interface of the memory controller during the clock cycle of the memory clock, first signals corresponding to the first memory operation and second signals corresponding to the second memory operation.

In another aspect of the disclosure, an apparatus may include the memory controller according to aspects of the disclosure herein as part of a host device configured to communicate with a memory through a channel. The host device may include components configured to share the contents of the memory and access the memory through the channel and the memory controller. For example, the host device may include components such as a processor, a graphics processor, a neural processor comprising one or more neural network processing cores, and/or a digital signal processor (DSP). In some embodiments, the host device is integrated into a single semiconductor package with the memory controller and/or the memory.

In an additional aspect of the disclosure, an apparatus, such as a wireless device, includes at least one processor and a memory coupled to the at least one processor. The at least one processor is configured to communicate with the memory through a memory controller coupled to a channel that couples the processor to the memory. The processor may be a processor, controller, or other logic circuitry in a host.

In an additional aspect of the disclosure, a non-transitory computer-readable medium stores instructions that, when executed by a processor, cause the processor to perform operations described herein regarding aspects of the disclosure.

Memories in the present disclosure may be embedded within a processor on a semiconductor die or be part of a different semiconductor die. The memories may be of various kinds. For example, the memory may be static random access memory (SRAM), dynamic random access memory (DRAM), magnetic random access memory (MRAM), NAND flash, or NOR flash, etc.

Methods and apparatuses are presented in the present disclosure by way of non-limiting examples of Low-Power Double Data Rate (LPDDR) Synchronous Dynamic Random Access Memory (SDRAM). For example, the LPDDR memory operating in accordance with LPDDR specification promulgated by Joint Electronic Device Engineering Council (JEDEC). One such LPDDR specification may be LPDDR5. Another such LPDDR specification may be LPDDR6.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in a recording or as streaming data, over a first network connection of a plurality of network connections. The processor may be coupled to the first network adaptor and a memory for storing data to support the processing and communications operations performed by the processor. The network adaptor may support communication over a wireless communications network such as a 5G NR communication network. The processor may cause the transmission of data stored in memory over the wireless communication network.

The foregoing has outlined, rather broadly, the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support data processing, including techniques for interfacing a memory controller to a memory in an electronic device, such as wireless communication device. The memory controller may interface with the memory at a first speed (e.g., the memory clock frequency). The cores of the memory controller may operate at a second speed (e.g., clock rate) that is lower than the memory speed (e.g., memory clock). A bandwidth, or speed of transferring data to and/or from the memory, is proportional to the memory clock. Configurations for a memory controller according to aspects described herein provide for operating multiple cores at a slower speed than the memory with little or no reduction in utilization of the bandwidth available to the memory based on the memory clock.

Particular implementations of the subject matter described in this disclosure may be implemented to realize one or more of the following potential advantages or benefits. In some aspects, the present disclosure provides for reduced cost by allowing portions of the memory controller to operate at a slower speed, which may reduce complexity in circuit design and manufacturing. In some aspects, the present disclosure provides for reduced power consumption because power consumption may scale with clock frequency and lower frequencies at each of the cores reduces power consumption in a large percentage of the memory controller.

Figure 1:
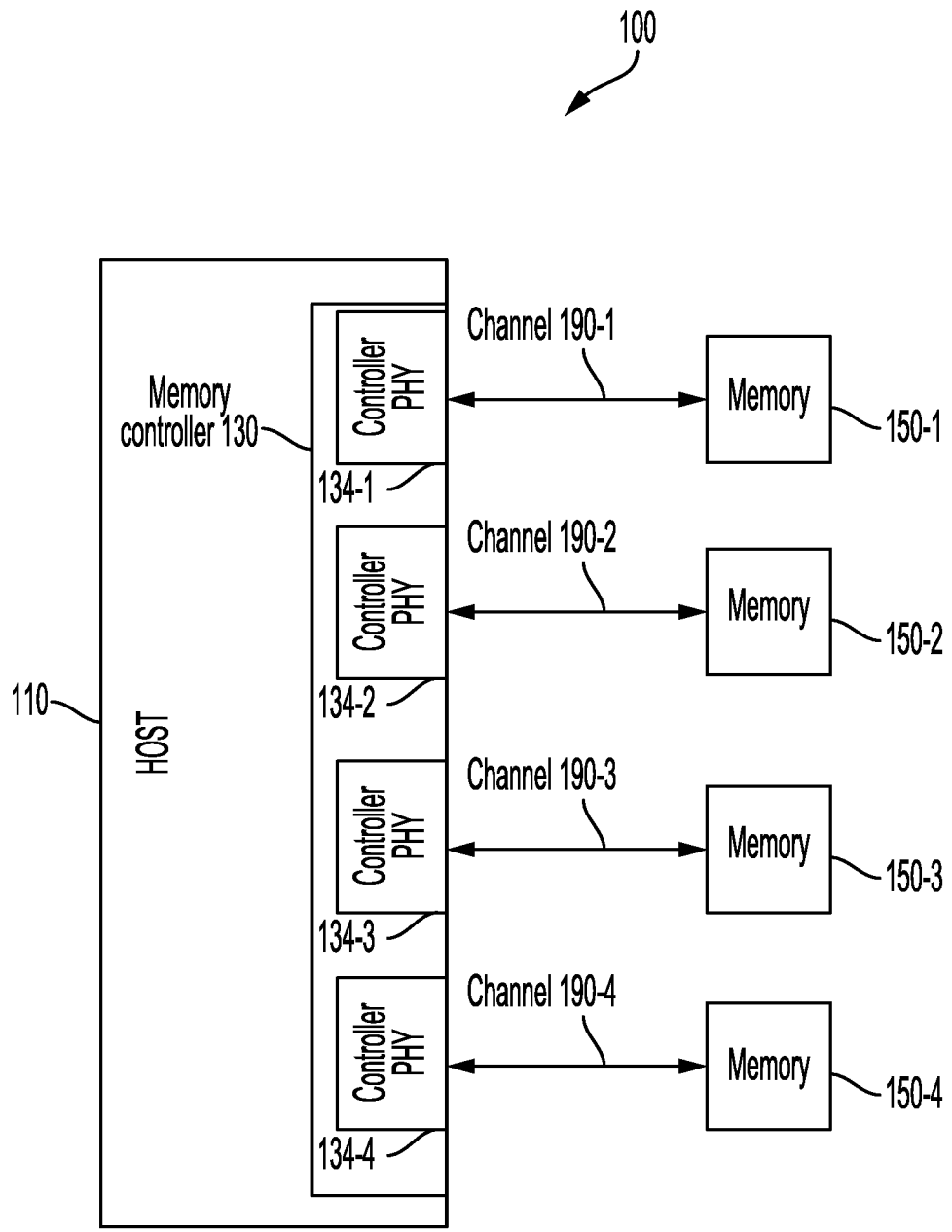
FIG. 1 shows a block diagram of an example computing system incorporating a host, memories, and channels coupling the host and the memories according to one or more aspects of the disclosure.

FIG. 1 illustrates an apparatus 100 incorporating a host 110, memories 150, and channels 190 coupling the host 110 and the memories 150. The apparatus 100 may be, for example, a device among computing systems (e.g., servers, datacenters, desktop computers), mobile computing device (e.g., laptops, cell phones, vehicles, etc.), Internet of Things devices, virtual reality (VR) systems, augmented reality (AR) systems, automobile systems (e.g., driver assistance systems, autonomous driving systems), image capture devices (e.g., stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities), and/or multimedia systems (e.g., televisions, disc players, streaming devices).

The host 110 may include at least one processor, such as central processing unit (CPU), graphic processing unit (GPU), digital signal processor (DSP), multimedia engine, and/or neural processing unit (NPU). The host 110 may be configured to couple and to communicate to the memories 150 (e.g., memories 150-1 to 150-4), via channels 190 (e.g., channels 190-1 to 190-4), in performing the computing functions, such as one of data processing, data communication, graphic display, camera, AR or VR rendering, image processing, neural processing, etc. For example, the memories 150-1 to 150-4 may store instructions or data for the host to perform the computing functions.

The host 110 may include a memory controller 130, which may include controller PHY modules 134-1 to 134-4. Each of the controller PHY modules 134-1 to 134-4 may be coupled to a respective one of the memories 150-1 to 150-4 via respective channels 190-1 to 190-4. For ease of reference, read and write are referenced from a perspective of the host 110. For example, in a read operation, the host 110 may receive via one or more of the channels 190-1-190-4 data stored from one or more of the memories 150-1 to 150-4. In a write operation, the host 110 may provide via one or more of the channels 190-1-190-4 data to be written into one or more of the memories 150-1-150-4 for storage. The memory controller 130 may be configured to control various aspects, such as logic layers, of communications to and from the memories 150-1-150-4. The controller PHY modules 134-1-134-4 may be configured to control electrical characteristics (e.g., voltage levels, phase, delays, frequencies, etc.) of signals provided or received on the channels 190-1-190-4, respectively.

In some examples, the memories 150-1-150-4 may be LPDDR DRAM (e.g., LPDDR5, LPDDR6). In some examples, the memories 150-1-150-4 may be different kinds of memory, such as one LPDDR5, one LPDDR6, one Flash memory, and one SRAM, respectively. The host 110, the memories 150-1-150-4, and/or the channels 190-1-190-4 may operate according to an LPDDR (e.g., LPDDR5, LPDDR6) specification. In some examples, each of the channels 190-1-190-4 may include 16 bits of data (e.g., 16 DQs). In some examples, each of the channels 190-1-190-4 may operate on 32 bits of data (e.g., 32 DQs). In FIG. 1, four channels are shown, however the apparatus 100 may include more or less channels, such as 8 or 16 channels.

Figure 2:
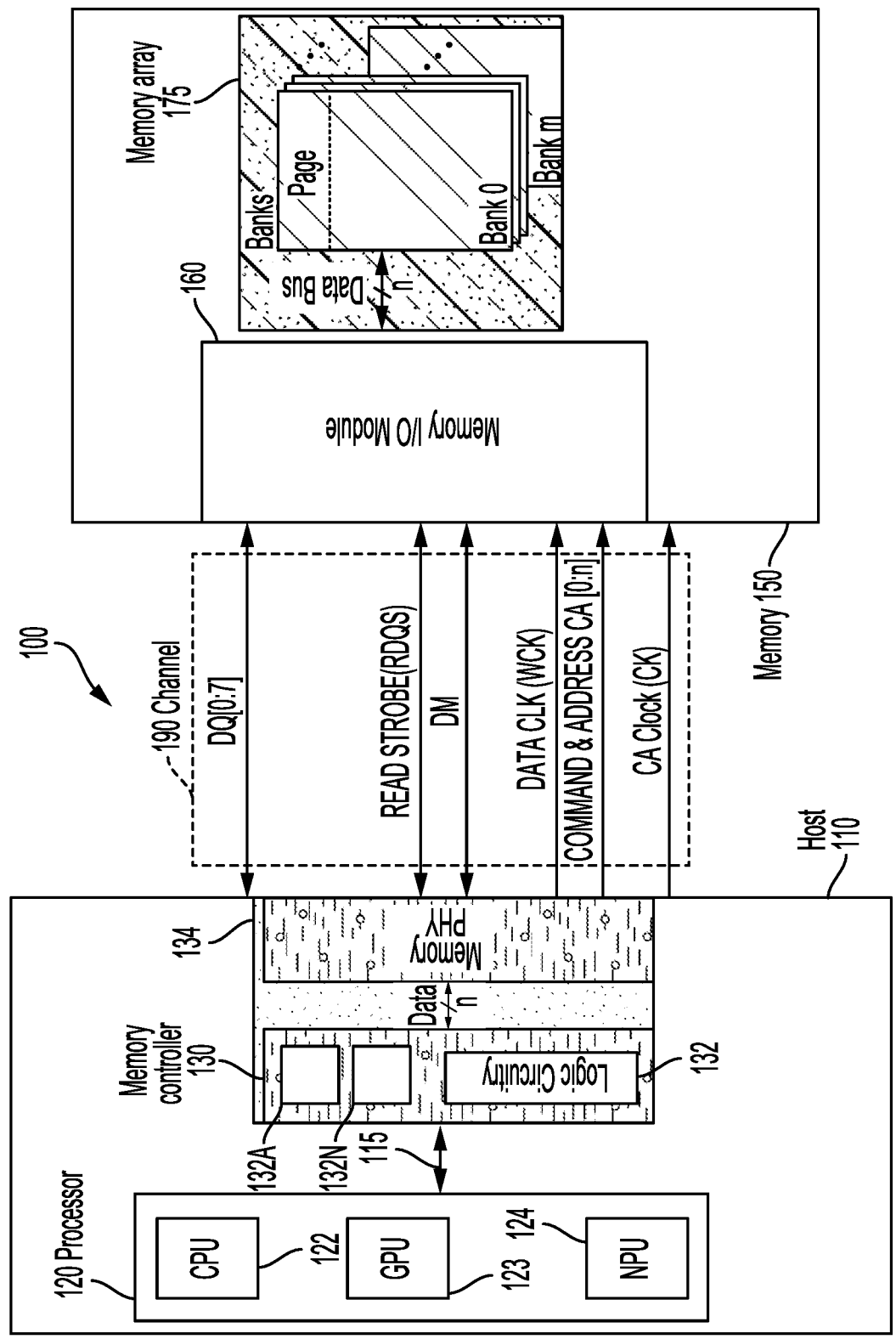
FIG. 2 shows a block diagram of an example computing system incorporating a host, memories, and channels coupling the host and the memories with another implementation of the channels according to one or more aspects of the disclosure.

A configuration of the host 110, the memory 150, and the channel 190 according to some aspects of the disclosure is shown with greater specificity in FIG. 2. FIG. 2 illustrates another representation of the apparatus 100 having the host 110, the memory 150, and the channel 190 of FIG. 1. The channel 190 between the host 110 and the memory 150 may include a plurality of connections, some of which carry data (e.g., user data or application data) and some of which carry non-data (e.g., addresses and other signaling information).

For example, non-data connections in channel 190 may include a data clock (e.g., WCK) used in providing data to the respective memory 150 and a read data strobe (e.g., RDQS) used in receiving data from the respective memory 150, on a per byte basis. The channel 190 may further include a data mask (e.g., DM, sometimes referred to as data mask inversion DMI to indicate multiple functions performed by the signal connection) signaling used to mask certain part of data in a write operation. The channel 190 may further include command and address (e.g., CA[0:n]) and associated CA clock to provide commands (e.g., read or write commands) to the memory 150.

The host 110 may include at least one processor 120, which may include a CPU 122, a GPU 123, and/or an NPU 124. The host 110 may further include a memory controller 130 having a controller PHY module 134 and logic circuitry 132. The memory controller 130 may couple to the at least one processor 120 via a bus system 115 in performing the various computing functions. The term "bus system" may provide that elements coupled to the "bus system" may exchange information therebetween, directly or indirectly. In different embodiments, the "bus system" may encompass multiple physical connections as well as intervening stages such as buffers, latches, registers, etc. A module may be implemented in hardware, software, or a combination of hardware and software. The logic circuitry 132 may coordinate execution of memory requests received over the bus system 115, such as by scheduling transmission of signals over connections of the channel 190 by controlling the controller PHY module 134.

The memory controller 130 may send and/or receive blocks of data to other modules, such as the at least one processor 120 and/or the memory 150. The memory 150 may include a memory I/O module 160 (e.g., a PHY layer) configured to control electrical characteristics (e.g., voltage levels, phase, delays, frequencies, etc.) to provide or to receive signals on connections of the channel 190. For example, memory I/O module 160 may be configured to capture (e.g., to sample) data, commands, and addresses from the host 110 via the channel 190 and to output data to the host 110 via the channel 190. Example techniques for communicating on the channel 190 between the memory I/O module 160 and the memory controller 130 are shown in the examples of FIGS. 6A-B and 7A-B. The memory 150 may further include a memory array 175, which may include multiple memory cells (e.g., DRAM memory cells, MRAM memory cells, SRAM memory cells, Flash memory cells) that store values. The host 110 may read data stored in the memory array 175 and write data into the memory array 175, via the channel 190 and the memory I/O module 160. The memory array 175 may be divided into a plurality of banks with each bank organized as a plurality of pages accessed by column.

Application or user data may be processed by the processor 120 and the memory controller 130 instructed to store and/or retrieve such data from the memory 150. For example, data may be generated during the execution of an application, such as a spreadsheet program that computes values based on other data. As another example, data may be generated during the execution of an application by receiving user input to, for example, a spreadsheet program. As a further example, data may be generated during the execution of a gaming application, which generates information regarding a representation of a scene rendered by a three-dimensional (3-D) application.

The host 110 is coupled to the memory 150 via the channel 190, which is illustrated for a byte of data, DQ[0:7].

The channel 190 and signaling between the host 110 and the memory 150 may be implemented in accordance with the JEDEC DRAM specification (e.g., LPDDR5, LPDDR6). As illustrated, the channel 190 includes signal connections of the DQs, a read data strobe (RDQS), a data mask (DM), a data clock (WCK), command and address (CA[0:n]), and command and address clock (CK). The host 110 may use the read data strobe RDQS to strobe (e.g., to clock) data in a read operation to receive the data on the DQs. The memory 150 may use the data mask DM to mask certain parts of the data from being written in a write operation. The memory 150 may use the data clock WCK to sample data on the DQs for a write operation. The memory 150 may use the command and address clock CK to clock (e.g., to receive) the CAs. A signal connection for each of the signaling may include a pin at the host 110, a pin at the memory 150, and a conductive trace or traces electrically connecting the pins. The conductive trace or traces may be part of a single integrated circuit (IC) on a silicon chip containing the processor 120 and the memory 150, may be part of a package on package (POP) containing the processor 120 and the memory 150, or may be part of a printed circuit board (PCB) coupled to both the processor 120 and the memory 150.

The memory 150 may include a memory I/O module 160 (e.g., a PHY layer) configured to control electrical characteristics (e.g., voltage levels, phase, delays, frequencies, etc.) to provide or to receive signals on the channel 190. For example, memory I/O module 160 may be configured to capture (e.g., to sample) data, commands, and addresses from the host 110 via the channel 190 and to output data to the host 110 via the channel 190. Information transmitted across the channel 190 may be stored in registers in the memory I/O module 160 of the memory 150 as a temporary or short-term storage location prior to longer-term storage in the memory array 175.

The memory 150 may further include a memory array 175, which may include multiple memory cells (e.g., DRAM memory cells) that store information. The host 110 may read data stored in the memory array 175 and write data into the memory array 175 via the channel 190.

The memory controller 130 may be operated at a memory controller clock frequency based on a clock signal supplied to the memory controller 130 or generated within the memory controller 130 from an external clock signal provided to the memory controller 130. The memory controller clock frequency is conventionally the same as the memory clock of the memory 150. Operating the memory controller 130 and the memory 150 at the same clock frequency maintain high efficiency, latency and bandwidth. As the memory device frequencies increase, designing and manufacturing a memory controller operating at the increased clock frequencies can be challenging. Decreasing the memory controller clock frequency from the memory clock frequency may reduce the challenges, but the reduced rate of operation of the memory controller may decrease bandwidth utilization of the memory (e.g., a maximum bandwidth that can be provided by the memory), thus reducing performance of the device.

According to aspects of this disclosure, the memory controller 130 may include multiple cores, each core comprising logic circuitry for scheduling operations at the memory 150 for fulfilling memory requests. In some embodiments, the cores are symmetric such that each core is capable of generating the same set of commands for output to the memory. In some embodiments, the cores are asymmetric such that each core is capable of generating different (either overlapping or non-overlapping) sets of commands for output to the memory. Each processing core 132A-N may operate at a memory clock frequency that is a lower frequency than the memory clock frequency. Although each core may not be able to fully utilize the memory 150 due to its lower operating frequency, multiple cores operating together may improve the utilization of the memory 150 and reach efficiency and bandwidth capable of a single core operating at the memory clock frequency. The use of multiple cores may improve the balance between high performance, low power, and low cost.

The multiple cores 132A-N may be configured to schedule commands that can be transmitted to the memory 150 together. Two examples are shown in FIGS. 3A-B.

Figures 3A, 3B:
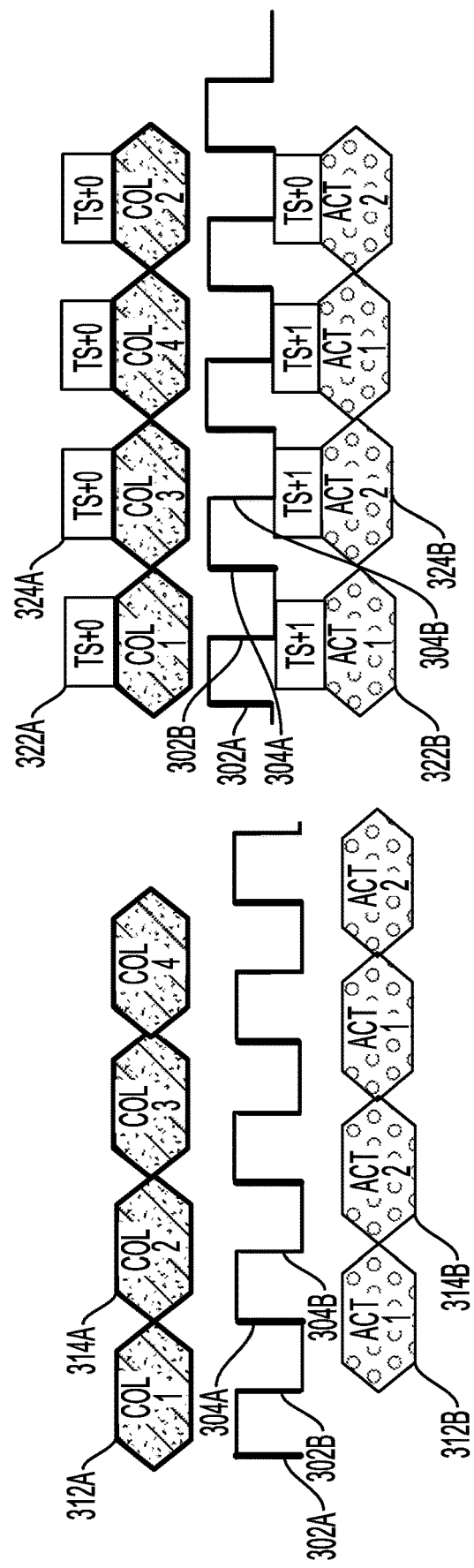
FIG. 3A is an example timing diagram for transmitting commands from different cores on different clock edges according to some aspects of the disclosure.
FIG. 3B is an example timing diagram for transmitting commands with timestamps from different cores on different clock edges according to some aspects of the disclosure.

FIG. 3A is an example timing diagram for transmitting commands from different cores on different clock edges according to some aspects of the disclosure. A memory controller clock signal is shown with edges 302A, 302B, 304A, and 304B. The memory controller clock signal may have a cycle time longer than (e.g., frequency lower than) a clock to the memory device when there are two or more cores in the memory controller. In some embodiments, the memory clock controller frequency is a ratio 1/N of the memory clock, in which N corresponds to the number of cores in the memory controller. As described further regarding FIG. 3A, in a two-core embodiment one memory controller core sends commands at half the memory clock frequency on the positive edges and another memory controller core sends commands at half the memory clock frequency on the negative edges. The memory clock, which is double (or some other ratio of) the frequency of the memory controller clock receives commands on each of the memory clock cycles. For example, the memory device receives command 312A on a first clock of the memory and then command 312B on a second clock of the memory, and then command 314A and then command 314B. The result is that the memory device receives commands faster than either of the memory controller cores sends commands. In an embodiment with two memory controller cores operating at half the memory clock frequency, the memory device may receive a command for each clock of the memory.

Edges 302A and 304A are rising clock edges, with the clock transitioning from low to high. Edges 302B and 304B are falling clock edges, with the clock transitioning from high to low. One clock cycle begins with the rising clock edge at edge 302A and continues to the rising clock edge at edge 304A.

Commands 312A, 312B, 314A, and 314B may be transmitted from the memory controller 130 to the memory 150 through the memory PHY interface 134. A first core may schedule commands 312A and 314A, and a second core may schedule commands 312B and 314B. Although the two cores may not be able to individually generate commands for every memory clock cycle, the commands from the cores may be interleaved to increase utilization of the memory. For example, the first core may signal commands on rising clock edges of edges 302A and 304A and the second core may signal commands on falling clock edges of edges 302B and 304B. In some embodiments, the two or more cores may be assigned particular clock edges for scheduling commands and those assignments may be static or dynamic. For example, in some embodiments two cores are each assigned to rising edges and falling edges, respectively. In other embodiments, each of the cores may be dynamically assigned a particular edge through a high-level scheduler. For example, the cores may be configured to generate different (overlapping or non-overlapping) commands and the cores dynamically assigned to certain clock edges by a high-level scheduler based on upcoming operations scheduling in a command queue.

Example signals may include column addresses for command 312A and 314A and activation signals for commands 312B and 314B. The cores may schedule the commands 312A-B and 314A-B and signal the memory controller PHY interface 314 to generate signals on the channel 190 to convey the commands to the memory 150. Although the example of FIG. 3A illustrates two cores scheduling commands for opposing clock edges, other configurations may be used. For example, four cores may schedule commands with each core scheduling for every second rising edge or falling edge. In this configuration, each of the four cores may operate at a clock frequency that is one quarter the memory clock frequency. Other multiples of cores and clock edges may be used, such as eight cores dividing up the memory clock cycles. Additionally, configurations may not require each core to operate only at certain clock edges but may allow cores to operate at different clock edges in the memory clock cycle.

The commands of FIG. 3A may be queued by the cores at certain clock edges to facilitate timing and sequencing of the commands. In some aspects of the disclosure, the commands may have associated timestamps to indicate the timing and/or sequencing of the commands.

FIG. 3B is an example timing diagram for transmitting commands with timestamps from different cores on different clock edges according to some aspects of the disclosure. Each of the commands 322A, 322B, 324A, and 324B may have associated timestamps. The timestamp may be an arbitrary counter indicating an intended sequence of the commands 322A-B and 324A-B. The timestamp may alternatively be an identifying value matching a memory clock cycle to which the command should be attached. Yet another timestamp example is an offset value indicating a relative position of the command with respect to a certain memory clock cycle. When a timestamp is transmitted along with the command, the commands may be sent to the memory PHY interface 134 on the same clock edge or different clock edge. The example of FIG. 3B shows the command 322A provided at the clock edge 302A along with the command 322B. The memory PHY interface 134 may use the accompanying timestamps to signal the command 322A over the channel 190 first followed by the command 322B at the next clock edge over the channel 190.

In some aspects, the logic circuitry or cores of the memory controller may be similarly configured in a symmetric manner such that each core is capable of scheduling the same commands. In other aspects, the logic circuitry or cores of the memory controller may be asymmetrically configured such that each core has different capabilities or responsibilities, although the capabilities or responsibilities may overlap between cores. Asymmetric configurations may have less flexibility but use less circuitry, resulting in smaller die areas and lower cost controllers.

Figure 4:
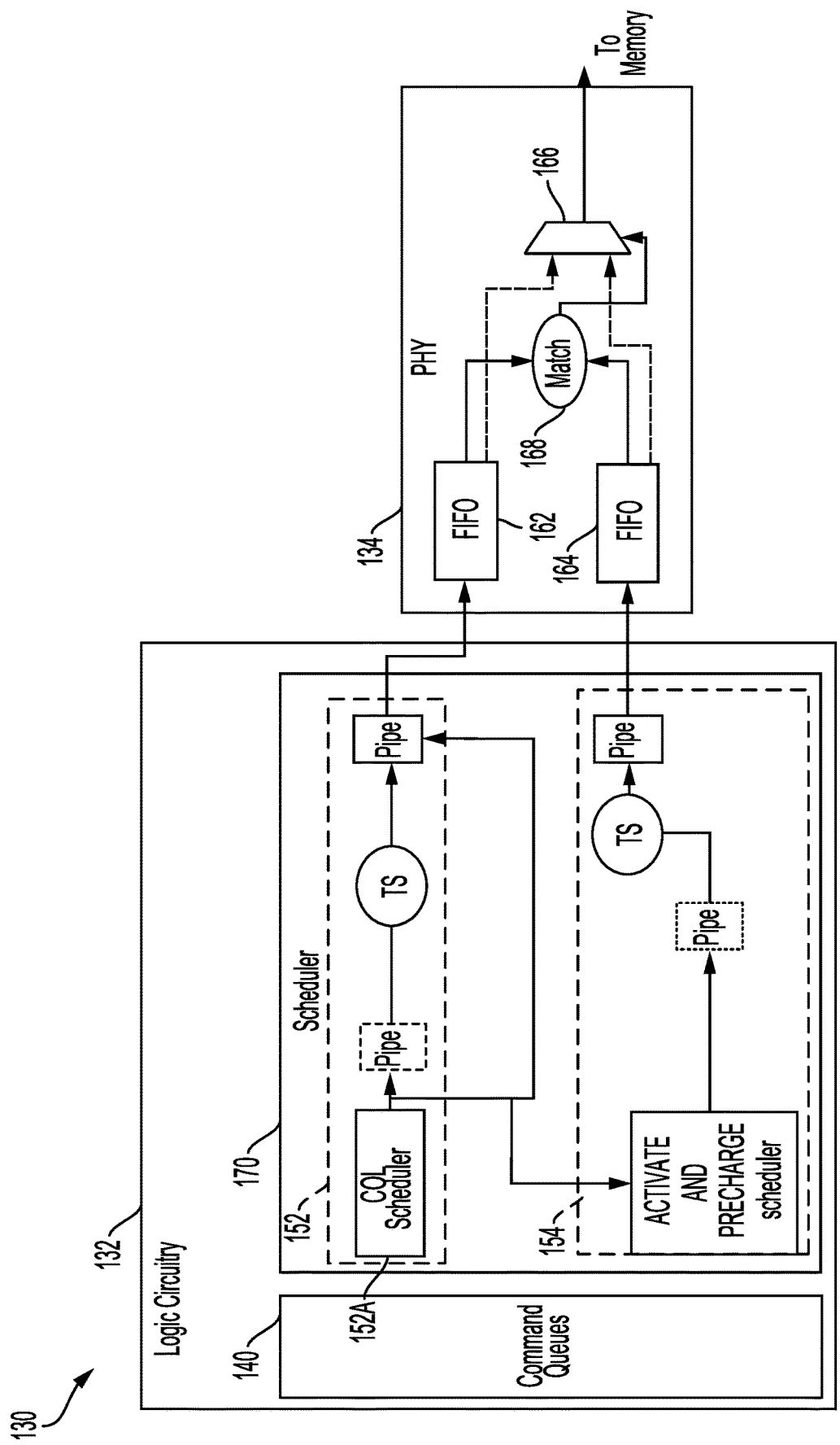
FIG. 4 is a block diagram illustrating a memory controller with asymmetric cores according to one aspect of the disclosure.

One example implementation of the memory controller to accommodate asymmetric cores is shown in FIG. 4. FIG. 4 is a block diagram illustrating a memory controller with asymmetric cores according to one aspect of the disclosure. Memory controller 130 includes logic circuitry 132 including command queues 140. The command queues 140 may receive and temporarily store memory requests received over bus system 115 from system components. A scheduler 170 processes requests in the command queue 140 and controls memory PHY interface 134 for controlling signaling to memory 150. The scheduler 170 may include two logic circuits (e.g., cores) 152 and 154. The core 152 may include a column scheduler 152A, which handles prioritizing and scheduling of column commands present in the command queue 140. The core 154 may include a precharge and activation scheduler.

The memory PHY interface 134 of the memory controller 130 may include a number of buffers 162 and 164. In some embodiments, the number of buffers may correspond to the number of cores in scheduler 170, although different configurations may be used. The PHY interface 134 may select outputs from the cores 152 and 154 for output through switch 166 to the memory 150. In some aspects, decision logic 168 may be used for matching timestamps between outputs of the buffers 162 and 164 to sequence commands in a desired order. The cores 152 and 154 may be synchronized through communication between the cores such that coherence is obtained between the two cores 152 and 154. For example, when the first core 152 sends a command, the second core 154 is aware of the commands sent by the first core 152 and then accordingly sends commands such that expectations of the memory device are satisfied. In some embodiments, a standards document or other specification document for the memory may specify a required sequence of commands that the cores 152 and 154 must collectively adhere to for obtaining valid output from the memory. In some aspects, the PHY interface 134 may alternate between the buffer 162 and 164 for transmitting command signals. In some aspects, the PHY interface 134 may use timestamps of the commands in the buffers 162 and 164 for sequencing signals to the memory 150.

Figure 5:
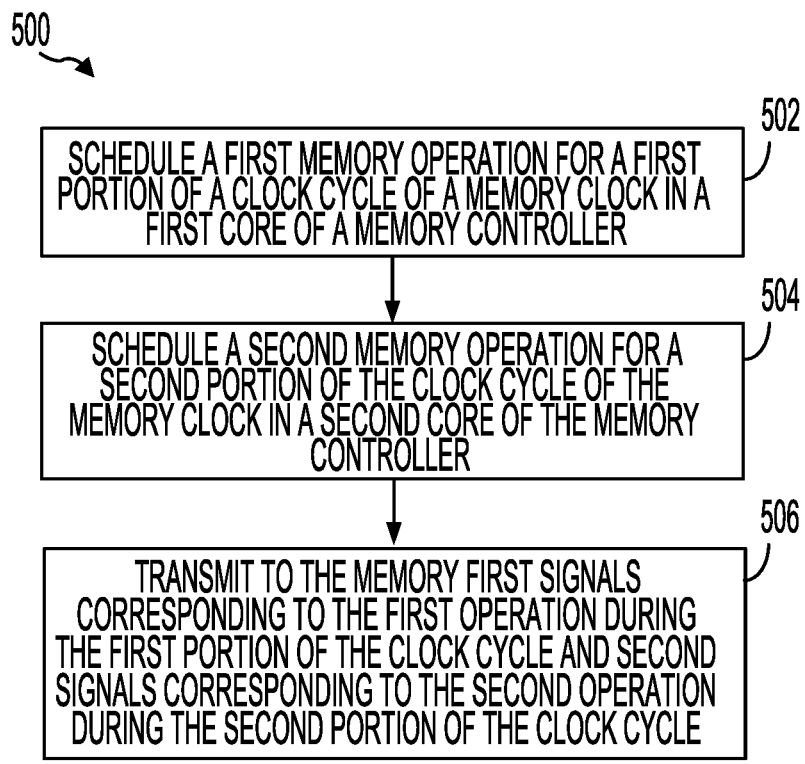
FIG. 5 is a flow chart of an example method of operation for a memory controller with multiple cores according to some aspects of the disclosure.

A method of operating a memory from a memory controller according to some of the aspects described is shown in FIG. 5. FIG. 5 is a flow chart of an example method of operation for a memory controller with multiple cores according to some aspects of the disclosure.

A method 500 includes, at block 502, scheduling a first memory operation by scheduling the first memory operation for a first portion of a clock cycle of a memory clock in a first core of a memory controller. The first core may execute based on a clock signal that has a clock frequency lower than a memory clock frequency at which the memory operates or the memory PHY interface operates. Although the lower clock frequency may result in the first core being unable to determine memory operations for the memory that utilizes all available memory bandwidth at the memory clock frequency, multiple cores operating at lower clock frequencies may improve utilization of the memory bandwidth. In some embodiments, multiple cores may be configured to fully utilize the memory bandwidth. In some aspects, the first core may determine memory operations for a particular portion of a clock cycle of the memory. For example, the first core may always schedule memory operations for a rising edge of a memory clock. As another example, the first core may schedule operations without regard to the portion of the clock cycle that the memory operation may execute with the memory PHY interface determining the clock cycle portion.

At block 504, the method 500 includes scheduling a second memory operation by scheduling the second memory operation for a second portion of the clock cycle of the memory clock in a second core of the memory controller. The second core may execute based on a clock signal that has a clock frequency lower than a memory clock frequency at which the memory operates or the memory PHY interface operates. The second core may have the same or different clock frequency as the first core. In some aspects, the second core may schedule memory operations for a particular portion of a clock cycle of the memory. For example, the second core may always schedule memory operations for a falling edge of a memory clock. As another example, the first core may schedule operations without regard to the portion of the clock cycle that the memory operation may execute with the memory PHY interface determining the clock cycle portion.

In one example operation, the retrieval of memory requests from a command queue may cause the first core to determine a column command and the second core to determine an activation command. In another example operation the retrieval of memory requests from the command queue may cause the first core to determine a column address and the second core to determine another column address.

At block 506, the method 500 includes transmitting to the memory first signals corresponding to the first operation during the first portion of the clock cycle and transmitting second signals corresponding to the second operation during the second portion of the clock cycle. The transmitting may be performed by a memory PHY interface, which receives outputs from the first core and the second core. The transmitting may include receiving the first memory operation in a first buffer (e.g., a first-in first-out (FIFO) buffer) and receiving the second memory operation in a second buffer (e.g., a second first-in first-out (FIFO) buffer).

In some aspects, timestamps are determined as part of the scheduling of the memory operations determined by the first core at block 502 and the second core at block 504. For example, the first memory operation may have an associated first timestamp and the second memory operation may have an associated second time stamp. The timestamps may be used by the memory PHY interface for determining which memory operation is next for transmission over the channel.

Although two cores are described in many of the examples, the memory controller may be configured with additional cores, such as three cores, four cores, five cores, six cores, or more. The additional cores may be clocked at similar or different clock frequencies with each other. In some embodiments, the N cores are each clocked at a frequency of (1/N)*(memory clock), such that the combined memory operations from each of the N cores may fully utilize the memory bandwidth.

Figure 6A:
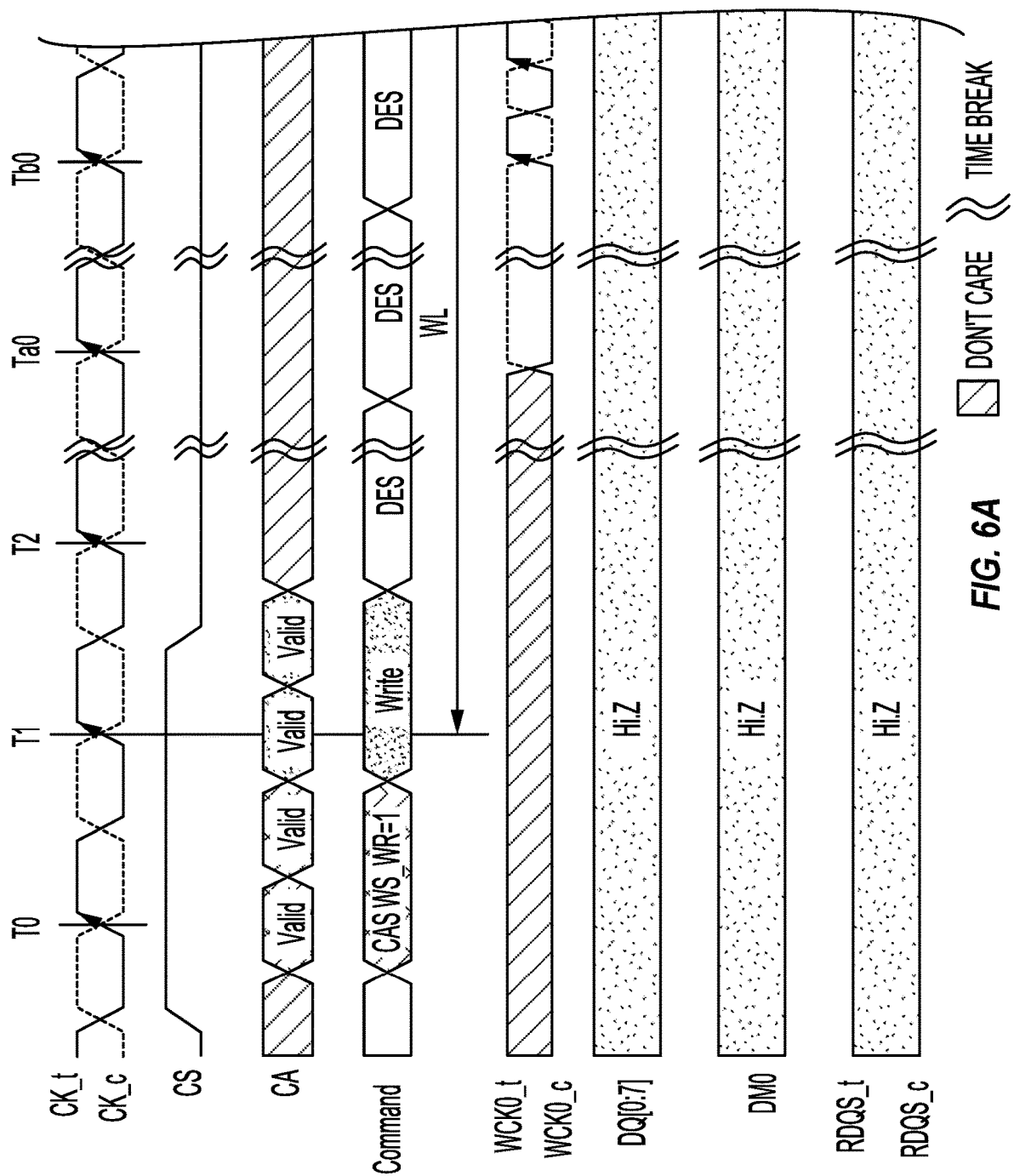
FIGS. 6A and 6B illustrate waveforms of transfer of data through an example channel in a write operation in accordance with certain aspects of the present disclosure.
Figure 6B:
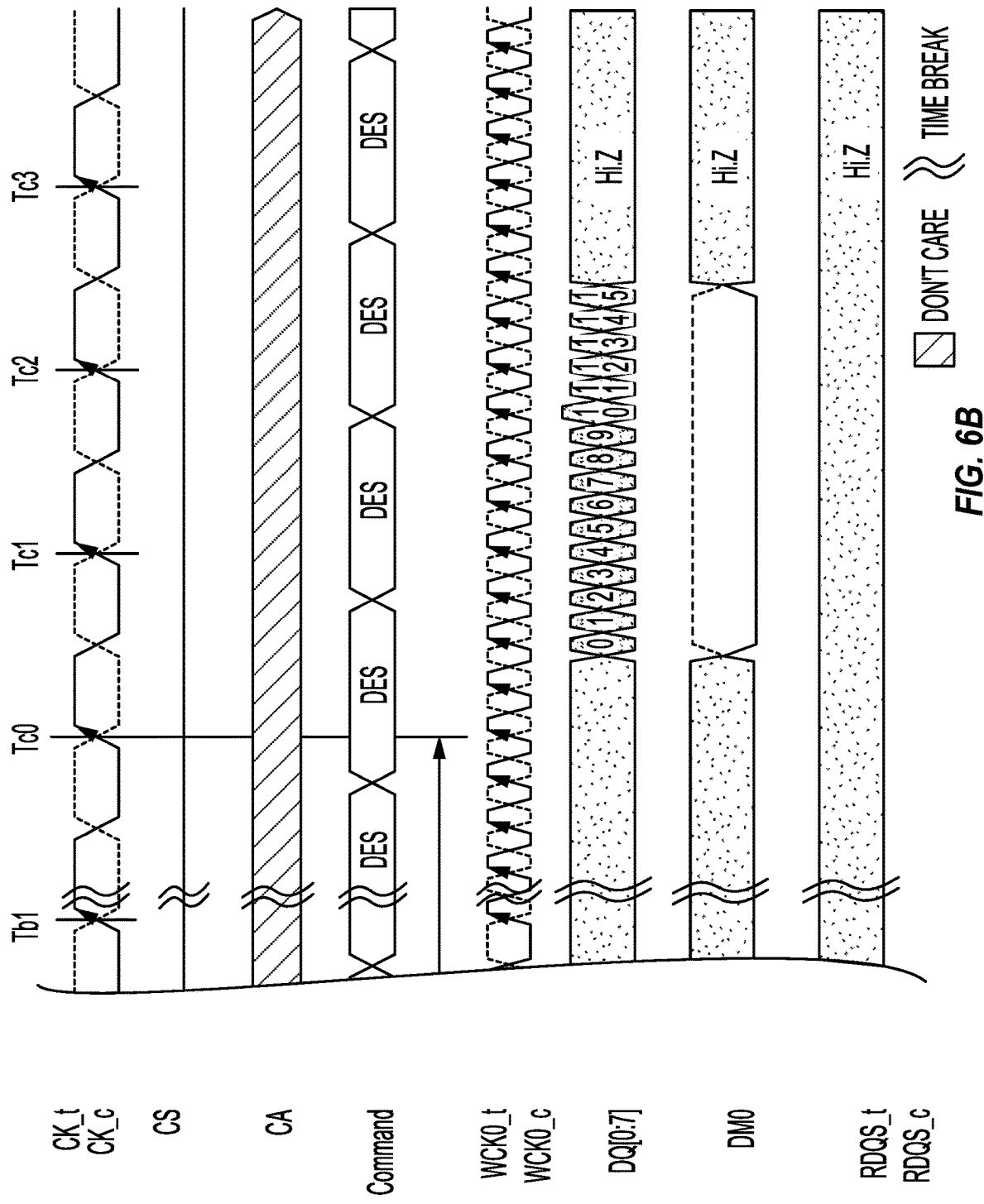
Figure 7A:
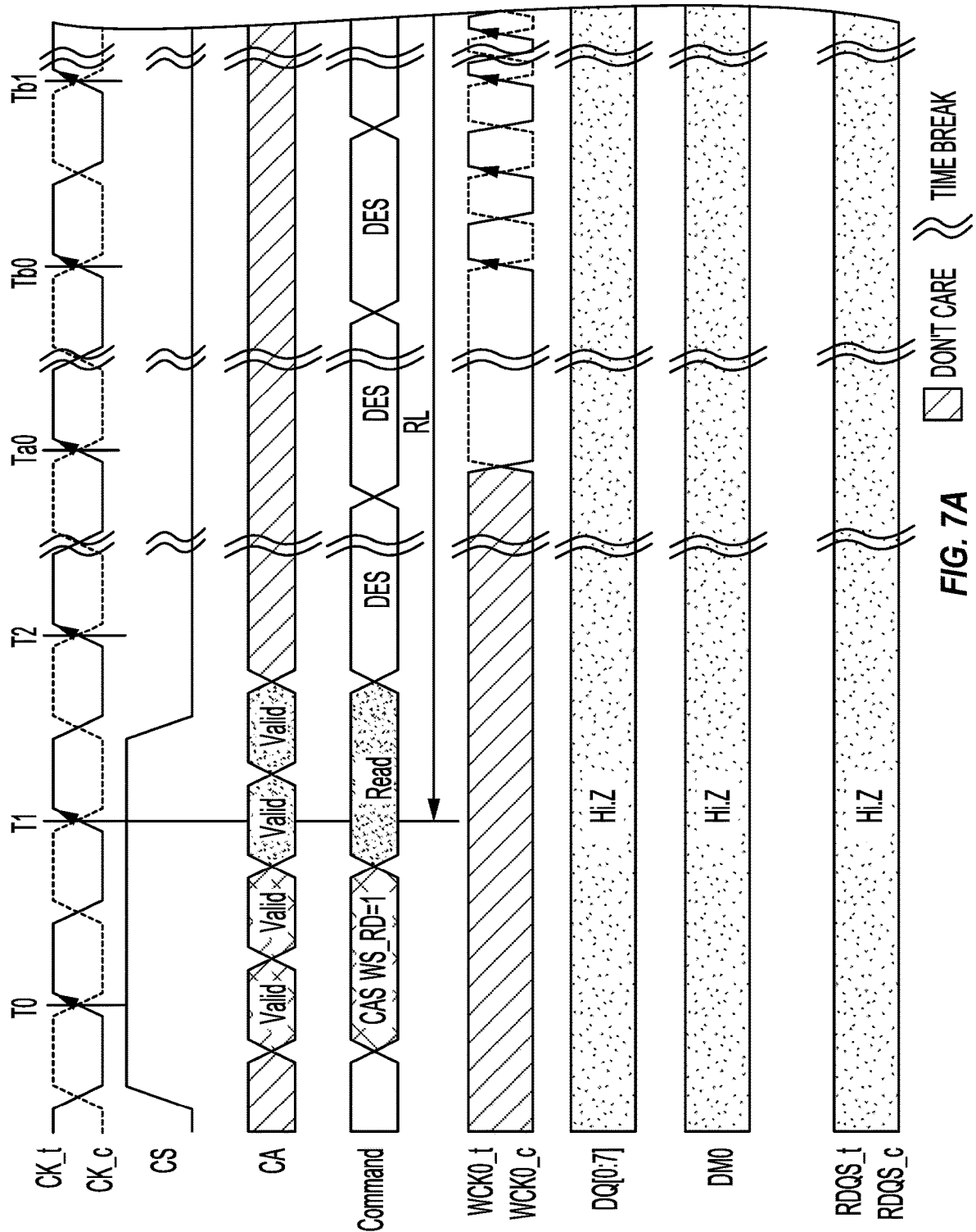
FIGS. 7A and 7B illustrate waveforms for transfer of data through an example channel in a read operation in accordance with certain aspects of the present disclosure.
Figure 7B:
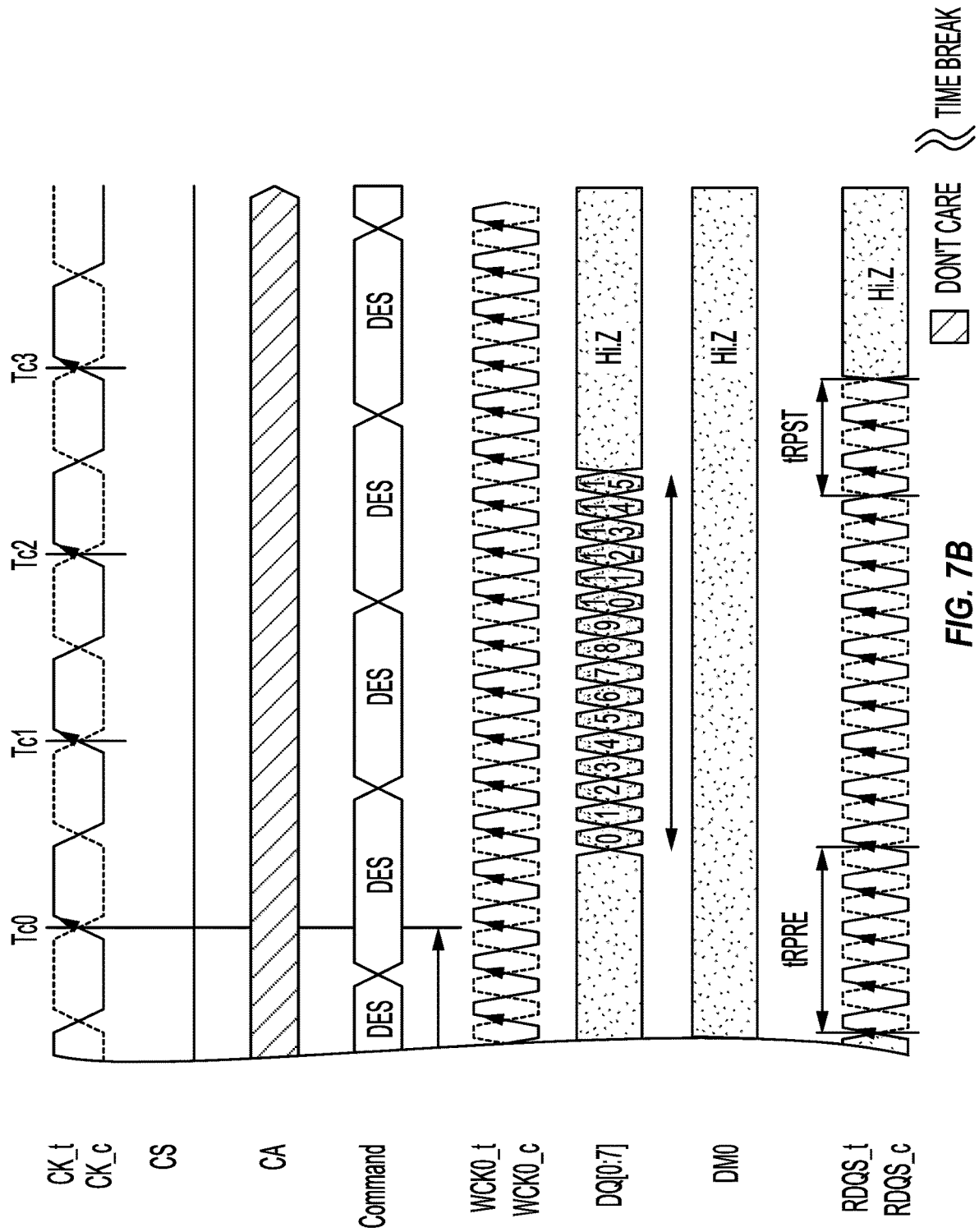

Example read and write operations that may be performed by the determination of commands by the first core and the second core are shown in the read operation of FIGS. 6A-B and the write operation of FIGS. 7A-B.

FIGS. 6A and 6B illustrate waveforms of transfer of data through an example channel in a write operation in accordance with certain aspects of the present disclosure. The command and address clock, CK, may be a differential signal having CK_t and CK_c signal connections. The data clock WCK may be a differential signal having WCK0_t and WCK0_c signal connections. The read data strobe RDQS may be a differential signal having RDQS_t and RDQS_c signal connections. The data mask is labeled DM0 to indicate that DM0 corresponds to a lower byte of DQs (DQ[0:7]). At T0 (rising edge of CK_c and falling edge of CK_t), a CAS command may be provided by the host 110 for a write operation to the memory 150. At T1, a write command may be provided by the host 110 to the memory 150.

After a time period write latency (WL), the host 110 may toggle the data clock WCK0_t and WCK0_c to provide the memory 150 with clocking for receiving data for write, on the DQ signal connections. At Tc0-Tc2, the memory 150 may receive 16 bytes of data serially, on each of the DQ[0:7] signal connections and clocked by the data clock WCK0_t and WCK0_c. The memory 150 may receive 16 bits of the data mask DM0 serially (e.g., based on the data clock WCK0_t and WCK0_c) to mask certain portions of the received data from the write operation. In some examples, the 16 bytes of data and 16 bits of the data mask DM0 may be received by the memory 150, with each bit of the data mask DM0 masking a corresponding byte of the received data. At Tc0-Tc2, the RDQS_t signal connection may be a Hi-Z condition. In a read operation, the RDQS_t signal connection may be configured to provide a read data strobe (RDQS) from the memory 150 to the host 110

FIGS. 7A and 7B illustrate waveforms for transfer of data through an example channel in a read operation in accordance with certain aspects of the present disclosure. The command and address clock, CK, may be a differential signal having CK_t and CK_c signal connections. The data clock WCK may be a differential signal having WCK0_t and WCK0_c signal connections. The read data strobe RDQS may be a differential signal having RDQS_t and RDQS_c signal connections. The data mask is labeled DM0 to indicate that DM0 corresponds to a lower byte of DQs (DQ[0:7]). At T0 (rising edge of CK_c and falling edge of CK_t), a CAS command may be provided by the host 110 for a read operation to the memory 150. At T1, a read command may be provided by the host 110 to the memory 150.

After a time period read latency (RL), the memory 150 may toggle the read data strobe RDQS to provide the host 110 with clocking to receive data for the read operation on the DQ signal connections. At Tc0-Tc2, the host 110 may receive 16 bytes of data serially, on each of the DQ[0:7] signal connections and clocked by the read data strobe RDQS_t and RDQS_c. Thus, in the example, 16 bytes of data are received by the host 110.

At Tc0-Tc2, the data mask DM0 signal connection may be in a Hi-Z condition. In a write operation, the DM signal connection may be configured to provide a data mask from the host 110 to the memory 150, which is clocked by WCK0_t and WCK0_c.

A wireless communications device may include a memory configured to transfer data to a memory as illustrated in at least FIGS. 1 and 2, and according to any of the aspects disclosed herein, may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

In one or more aspects, techniques for memory storage and retrieval may include additional aspects, such as any single aspect or any combination of aspects described below or in connection with one or more other processes or devices described elsewhere herein. In a first aspect, supporting data operations may include an apparatus configured for scheduling, by a first core of the plurality of cores, a first memory operation for a first portion of a clock cycle of the memory clock; scheduling, by a second core of the plurality of cores, a second memory operation for a second portion of the clock cycle of the memory clock; and transmitting, by the memory physical (PHY) interface during the clock cycle of the memory clock, first signals corresponding to the first memory operation and second signals corresponding to the second memory operation.

Additionally, the apparatus may perform or operate according to one or more aspects as described below. In some implementations, the apparatus includes a wireless device, such as a UE. In some implementations, the apparatus includes a remote server, such as a cloud-based computing solution, which receives image data for processing to determine output image frames. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, the apparatus is further configured for scheduling the first memory operation as a column address; and scheduling the second memory operation as an activate command.

In a third aspect, in combination with one or more of the first aspect or the second aspect, the first portion of the clock cycle of the memory clock comprises a portion beginning at a rising clock edge of the memory clock; and the second portion of the clock cycle of the memory clock comprises a portion beginning at a falling clock edge of the memory clock.

In a fourth aspect, in combination with one or more of the first aspect through the third aspect, scheduling the first memory operation comprises determining a first timestamp corresponding to the first memory operation, determining the second memory operation comprises scheduling a second timestamp corresponding to the second memory operation, and transmitting the first signals and the second signals is based on the first timestamp and the second timestamp.

In a fifth aspect, in combination with one or more of the first aspect through the fourth aspect, the first timestamp corresponds to a rising clock edge of the memory clock and the second timestamp corresponds to a falling clock edge of the memory clock.

In a sixth aspect, in combination with one or more of the first aspect through the fifth aspect, the memory physical (PHY) interface comprises a first buffer configured to store the first memory operation from the first core and a second buffer configured to store the second memory operation from the second core.

In a seventh aspect, in combination with one or more of the first aspect through the sixth aspect, the first core comprises first logic circuitry configured for scheduling a memory operation of at least a first type, wherein the first logic circuitry is coupled to the first buffer; and the second core comprises second logic circuitry configured for scheduling a memory operation of at least a second type, in which at least one of the at least a second type is different from the first type, wherein the second logic circuitry is coupled to the second buffer.

In an eighth aspect, in combination with one or more of the first aspect through the seventh aspect, the first logic circuitry is configured for scheduling at least a column address operation; and the second logic circuitry is configured for scheduling at least a precharge operation or an activate operation.

In a ninth aspect, in combination with one or more of the first aspect through the eighth aspect, the memory controller is configured to output back-to-back column addresses on a rising clock edge and a falling clock edge of the memory clock.

In a tenth aspect, in combination with one or more of the first aspect through the ninth aspect, the memory physical (PHY) interface is configured to operate at the memory clock frequency.

In an eleventh aspect, in combination with one or more of the first aspect through the tenth aspect, an apparatus may include a host device that includes the memory controller according to one or more of these aspects, in which the apparatus includes a memory and the host device is configured to communicate with a memory through a channel.

In a twelfth aspect, in combination with the eleventh aspect, the host device may include a processor coupled to the memory controller.

In a thirteenth aspect, in combination with one or more of the eleventh aspect through the twelfth aspect, the host device further includes a graphics processor coupled to the memory controller; and a neural processor coupled to the memory controller, wherein the memory controller comprises a command queue configured to receive memory requests from the processor, the graphics processor, and the neural processor.

In a fourteenth aspect, in combination with one or more of the first aspect through the thirteenth aspect, the graphics processor, the neural processor, the processor, and the memory are integrated in a single semiconductor package.

In the description of embodiments herein, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating," "scheduling," or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (e.g., application specific integrated circuits (ASICs), digital signal processors (DSP), graphics processing unit (GPU), central processing unit (CPU)) configured to perform the recited function through hardware, software, or a combination of hardware configured by software.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-2 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIG. 1, 2, or 4 may be combined with one or more blocks (or operations) described with reference to another of the figures. For example, one or more blocks (or operations) of FIGS. 3A-3B may be combined with one or more blocks (or operations) of FIG. 1 or 2. As another example, one or more blocks associated with FIGS. 5, 6A-6B, or 7A-7B may be combined with one or more blocks (or operations) associated with FIG. 1, 2, or 4.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single-or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as "upper" and "lower," or "front" and back," or "top" and "bottom," or "forward" and "backward" are sometimes used for ease of describing the figures, and indicate relative positions corresponding to the orientation of the figure on a properly oriented page, and may not reflect the proper orientation of any device as implemented.

As used herein, the term "coupled to" in the various tenses of the verb "couple" may mean that element A is directly connected to element B or that other elements may be connected between elements A and B (i.e., that element A is indirectly connected with element B), to operate certain intended functions. In the case of electrical components, the term "coupled to" may also be used herein to mean that a wire, trace, or other electrically conductive material is used to electrically connect elements A and B (and any components electrically connected therebetween). In some examples, the term "coupled to" mean a transfer of electrical energy between elements A and B, to operate certain intended functions.

In some examples, the term "electrically connected" mean having an electric current or configurable to having an electric current flowing between the elements A and B. For example, the elements A and B may be connected via resistors, transistors, or an inductor, in addition to a wire, trace, or other electrically conductive material and components. Furthermore, for radio frequency functions, the elements A and B may be "electrically connected" via a capacitor.

The terms "first," "second," "third," etc. are employed for ease of reference and may not carry substantive meanings. Likewise, names for components/modules may be adopted for ease of reference and might not limit the components/modules.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An apparatus, comprising:
   a memory controller operating based on a first clock at a memory controller clock frequency, wherein the memory controller is:
   comprised of a memory physical (PHY) interface operated based on a memory clock at a memory clock frequency and of a plurality of cores, each of the plurality of cores operated at the memory controller clock frequency which is less than the memory clock frequency,
   coupled to a memory through a channel by the memory physical (PHY) interface,
   configured to access data stored in the memory through the channel and the memory physical (PHY) interface, and
   configured to perform operations comprising:
   scheduling, by a first core of the plurality of cores, a first memory operation for a first portion of a clock cycle of the memory clock, wherein the first core comprises first logic circuitry configured for scheduling a memory operation of at least a first type, wherein the first logic circuitry is coupled to the first buffer;
   scheduling, by a second core of the plurality of cores, a second memory operation for a second portion of the clock cycle of the memory clock, where the second core comprises second logic circuitry configured for scheduling a memory operation of at least a second type, in which at least one of the at least a second type is different from the first type, wherein the second logic circuitry is coupled to the second buffer; and
   transmitting, by the memory physical (PHY) interface during the clock cycle of the memory clock, first signals corresponding to the first memory operation and second signals corresponding to the second memory operation, wherein the memory physical (PHY) interface comprises a first buffer configured to store the first memory operation from the first core and a second buffer configured to store the second memory operation from the second core.

2. The apparatus of claim 1, wherein:
   scheduling the first memory operation comprises scheduling a column address; and scheduling the second memory operation comprises scheduling an activate command.

3. The apparatus of claim 2, wherein:
the first portion of the clock cycle of the memory clock comprises a portion beginning at a rising clock edge of the memory clock; and
the second portion of the clock cycle of the memory clock comprises a portion beginning at a falling clock edge of the memory clock.

4. The apparatus of claim 3, wherein:
scheduling the first memory operation comprises determining a first timestamp corresponding to the first memory operation,
scheduling the second memory operation comprises determining a second timestamp corresponding to the second memory operation, and
transmitting the first signals and the second signals is based on the first timestamp and the second timestamp.

5. The apparatus of claim 4, wherein the first timestamp corresponds to a rising clock edge of the memory clock and the second timestamp corresponds to a falling clock edge of the memory clock.

6. The apparatus of claim 1, wherein:
the first logic circuitry is configured for scheduling at least a column address operation; and
the second logic circuitry is configured for scheduling at least a precharge operation or an activate operation.

7. The apparatus of claim 6, wherein the memory controller is configured to output back-to-back column addresses on a rising clock edge and a falling clock edge of the memory clock.

8. The apparatus of claim 1, wherein the memory physical (PHY) interface is configured to operate at the memory clock frequency.

9. The apparatus of claim 1, wherein the memory controller is configured to communicate with a memory comprising low power double data rate (LPDDR6) memory module.

10. A method, comprising:
scheduling, by a first core of the plurality of cores, a first memory operation for a first portion of a clock cycle of a memory clock in a first core of a memory controller, wherein scheduling the first memory operation for the first portion comprises scheduling a first type of memory operation in the first core;
storing, by a memory physical (PHY) interface, the first memory operation from the first core in a first buffer of the memory physical (PHY) interface of the memory controller;
scheduling, by a second core of the plurality of cores, a second memory operation for a second portion of a clock cycle of the memory clock in a second core of the memory controller, wherein scheduling the second memory operation for the second portion comprises scheduling a second type of memory operation in the second core different from the first type of memory operation;
storing, by the memory physical (PHY) interface, the second memory operation from the second core in a second buffer of the memory physical (PHY) interface of the memory controller; and
transmitting, by the memory physical (PHY) interface, to the memory, first signals corresponding to the first memory operation during the first portion of the clock cycle and second signals corresponding to the second memory operation during the second portion of the clock cycle, wherein the memory clock has a memory clock frequency higher than a memory controller frequency of the memory controller, wherein transmitting the first signals and the second signals comprises receiving the first memory operation from the first buffer and receiving the second memory operation from the second buffer.

11. The method of claim 10, wherein:
scheduling the first memory operation comprises scheduling a column address; and
scheduling the second memory operation comprises scheduling an activate command.

12. The method of claim 11, wherein:
the first portion of the clock cycle of the memory clock comprises a portion beginning at a rising clock edge of the memory clock; and
the second portion of the clock cycle of the memory clock comprises a portion beginning at a falling clock edge of the memory clock.

13. The method of claim 12, wherein:
scheduling the first memory operation comprises determining a first timestamp corresponding to the first memory operation,
scheduling the second memory operation comprises determining a second timestamp corresponding to the second memory operation, and
transmitting the first signals and the second signals is based on the first timestamp and the second timestamp.

14. The method of claim 13, wherein the first timestamp corresponds to a rising clock edge of the memory clock and the second timestamp corresponds to a falling clock edge of the memory clock.

15. The method of claim 10, wherein:
scheduling the first memory operation for the first portion comprises scheduling a column address operation, and
scheduling the second memory operation for the second portion comprises scheduling at least one of a precharge operation or an activate operation.

16. The method of claim 10, wherein:
scheduling the first memory operation for the first portion comprises scheduling a first column address operation,
scheduling the second memory operation for the second portion comprises scheduling a second column address operation, and
transmitting the first signals and the second signals comprises transmitting back-to-back column addresses on a rising clock edge and a falling clock edge of the memory clock.

17. The method of claim 10, wherein the memory physical (PHY) interface is configured to operate at the memory clock frequency.

18. The method of claim 10, wherein the memory controller is configured to communicate with a memory comprising low power double data rate (LPDDR6) memory module.

19. An apparatus, comprising:
a memory;
a host device configured to communicate with the memory through a channel,
the host device comprising a memory controller coupled to the channel, wherein the memory controller is:
comprised of a memory physical (PHY) interface operated based on a memory clock at a memory clock frequency and of a plurality of cores, each of the plurality of cores operated at a memory controller clock frequency less than the memory clock frequency, coupled to a memory through a channel by the memory physical (PHY) interface, configured to access data stored in the memory through the channel and the memory physical (PHY) interface, and configured to perform operations comprising:

scheduling, by a first core of the plurality of cores, a first memory operation for a first portion of a clock cycle of the memory clock, wherein the first core comprises first logic circuitry configured for scheduling a memory operation of at least a first type, wherein the first logic circuitry is coupled to the first buffer;

scheduling, by a second core of the plurality of cores, a second memory operation for a second portion of the clock cycle of the memory clock, where the second core comprises second logic circuitry configured for scheduling a memory operation of at least a second type, in which at least one of the at least a second type is different from the first type, wherein the second logic circuitry is coupled to the second buffer; and transmitting, by the memory physical (PHY) interface during the clock cycle of the memory clock, first signals corresponding to the first memory operation and second signals corresponding to the second memory operation, wherein the memory physical (PHY) interface comprises a first buffer configured to store the first memory operation from the first core and a second buffer configured to store the second memory operation from the second core.

20. The apparatus of claim 19, wherein:

scheduling the first memory operation comprises scheduling a column address; and scheduling the second memory operation comprises scheduling an activate command.

21. The apparatus of claim 20, wherein:

the first portion of the clock cycle of the memory clock comprises a portion beginning at a rising clock edge of the memory clock; and the second portion of the clock cycle of the memory clock comprises a portion beginning at a falling clock edge of the memory clock.

22. The apparatus of claim 21, wherein:

scheduling the first memory operation comprises determining a first timestamp corresponding to the first memory operation, scheduling the second memory operation comprises determining a second timestamp corresponding to the second memory operation, and transmitting the first signals and the second signals is based on the first timestamp and the second timestamp.

23. The apparatus of claim 19, wherein the host device comprises a processor coupled to the memory controller.

24. The apparatus of claim 23, wherein the host device further comprises:

a graphics processor coupled to the memory controller; and a neural processor coupled to the memory controller, wherein the memory controller comprises a command queue configured to receive memory requests from the processor, the graphics processor, and the neural processor.

25. The apparatus of claim 24, wherein the graphics processor, the neural processor, the processor, and the memory are integrated in a single semiconductor package.

\* \* \* \* \*